(12) United States Patent
Goldberg

(10) Patent No.: US 6,594,249 B1
(45) Date of Patent: Jul. 15, 2003

(54) METHOD AND APPARATUS IN A WIRELESS COMMUNICATION SYSTEM FOR INSERTING DATA INTO A DATA STREAM

(75) Inventor: Steven Jeffrey Goldberg, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/123,292

(22) Filed: Jul. 28, 1998

(51) Int. Cl.[7] ............................................... H04L 12/54
(52) U.S. Cl. ....................................... 370/345; 370/428
(58) Field of Search .................................. 370/310, 389, 370/412, 428, 429, 462, 498, 529, 528, 230.1, 395.4, 395.42, 395.43, 345, 465, 468, 474, 477

(56) References Cited

U.S. PATENT DOCUMENTS

| | | | |
|---|---|---|---|
| 4,914,650 A | | 4/1990 | Sriram |
| 5,557,608 A | * | 9/1996 | Calvignac et al. ........... 370/389 |
| 5,799,253 A | * | 8/1998 | Pedersen et al. ............ 455/527 |
| 6,081,505 A | * | 6/2000 | Kilkki ......................... 370/230 |
| 6,185,207 B1 | * | 2/2001 | LaBerge et al. ............ 370/392 |
| 6,292,484 B1 | * | 9/2001 | Oliver ......................... 370/389 |

* cited by examiner

Primary Examiner—Min Jung
(74) Attorney, Agent, or Firm—Roland K. Bowler, II

(57) ABSTRACT

A controller (112) queues (602) store-and-forward transmissions in corresponding blocks (506) of data having a predetermined length, and sends (604) the blocks of data to a transmitter (116). The transmitter stores (606) the blocks of data in preparation for transmission. The controller then determines (608) a need to transmit the data for a near-real-time transmission. In response, the controller and the transmitter cooperate (610) to replace, at the transmitter, a block of the blocks of data that has been received but has not yet been transmitted, with the data for the near-real-time transmission.

25 Claims, 5 Drawing Sheets

600

700

800

METHOD AND APPARATUS IN A WIRELESS COMMUNICATION SYSTEM FOR INSERTING DATA INTO A DATA STREAM

FIELD OF THE INVENTION

This invention relates in general to wireless communication systems, and more specifically to a method and apparatus in a wireless communication system for inserting, into a data stream, data for a near-real-time transmission that requires low latency, the data stream also serving a plurality of store-and-forward transmissions which do not require low latency.

BACKGROUND OF THE INVENTION

Modern wireless messaging systems have evolved synchronous protocols, such as Motorola's FLEX™ family of protocols. Such protocols provide excellent battery life for portable receivers and allow high channel utilization, both desirable goals of a messaging system.

A trade-off in such protocols is that, when adjusted to provide long battery life and great channel utilization, they also generally provide high latency, i.e., high delay between message entry and message transmission. Certain near-real-time communications, however, cannot tolerate high latency.

Thus, what is needed is a protocol model that provides excellent battery life and high channel utilization for high-latency communications, while simultaneously allowing some low-latency communications to function in the same system.

SUMMARY OF THE INVENTION

An aspect of the present invention is a method in a wireless communication system for inserting, into a data stream, data for a near-real-time transmission having a duration and requiring low latency, the data stream also serving a plurality of store-and-forward transmissions which do not require low latency, without disrupting the data stream for longer than the duration. The method comprises the steps of queuing the plurality of store-and-forward transmissions in a corresponding plurality of blocks of data having a predetermined length, and sending the plurality of blocks of data to a transmitter. The method further comprises the steps of storing the plurality of blocks of data in the transmitter in preparation for transmission, and determining a need to transmit the data for the near-real-time transmission. The method also includes the step of replacing, at the transmitter, a block of the plurality of blocks of data that has been received but has not yet been transmitted, with the data for the near-real-time transmission, in response to the determining step.

Another aspect of the present invention is a controller in a wireless communication system for inserting, into a data stream, data for a near-real-time transmission having a duration and requiring low latency, the data stream also serving a plurality of store-and-forward transmissions which do not require low latency, without disrupting the data stream for longer than the duration. The controller comprises a communication interface for receiving the data for the near-real-time and store-and-forward transmissions, and a processing system coupled to the communication interface for processing the data. The controller further comprises an output interface coupled to the processing system for sending the data stream to a transmitter. The processing system is programmed to queue the plurality of store-and-forward transmissions in a corresponding plurality of blocks of data having a predetermined length, and to send the plurality of blocks of data to a transmitter. The processing system is further programmed to determine a need to transmit the data for the near-real-time transmission, and to cooperate with the transmitter to replace, at the transmitter, a block of the plurality of blocks of data that has been received but has not yet been transmitted, with the data for the near-real-time transmission, in response to the need.

Another aspect of the present invention is a transmitter in a wireless communication system for inserting, into a data stream, data for a near-real-time transmission having a duration and requiring low latency, the data stream also serving a plurality of store-and-forward transmissions which do not require low latency, without disrupting the data stream for longer than the duration. The transmitter comprises a communication interface for receiving the data for the near-real-time and store-and-forward transmissions, and a processing system coupled to the communication interface for processing the data. The transmitter further comprises a transmitter element coupled to the processing system for transmitting the data stream. The processing system is programmed to receive the plurality of store-and-forward transmissions in a corresponding plurality of blocks of data having a predetermined length, and to store the plurality of blocks of data in the transmitter in preparation for transmission. The processing system is further programmed to receive an indication of a need to transmit the data for the near-real-time transmission, along with the data for the near-real-time transmission, and to replace a block of the plurality of blocks of data that has been received but has not yet been transmitted, with the data for the near-real-time transmission, in response to the need.

DETAILED DESCRIPTION OF THE DRAWINGS

Figure 1:
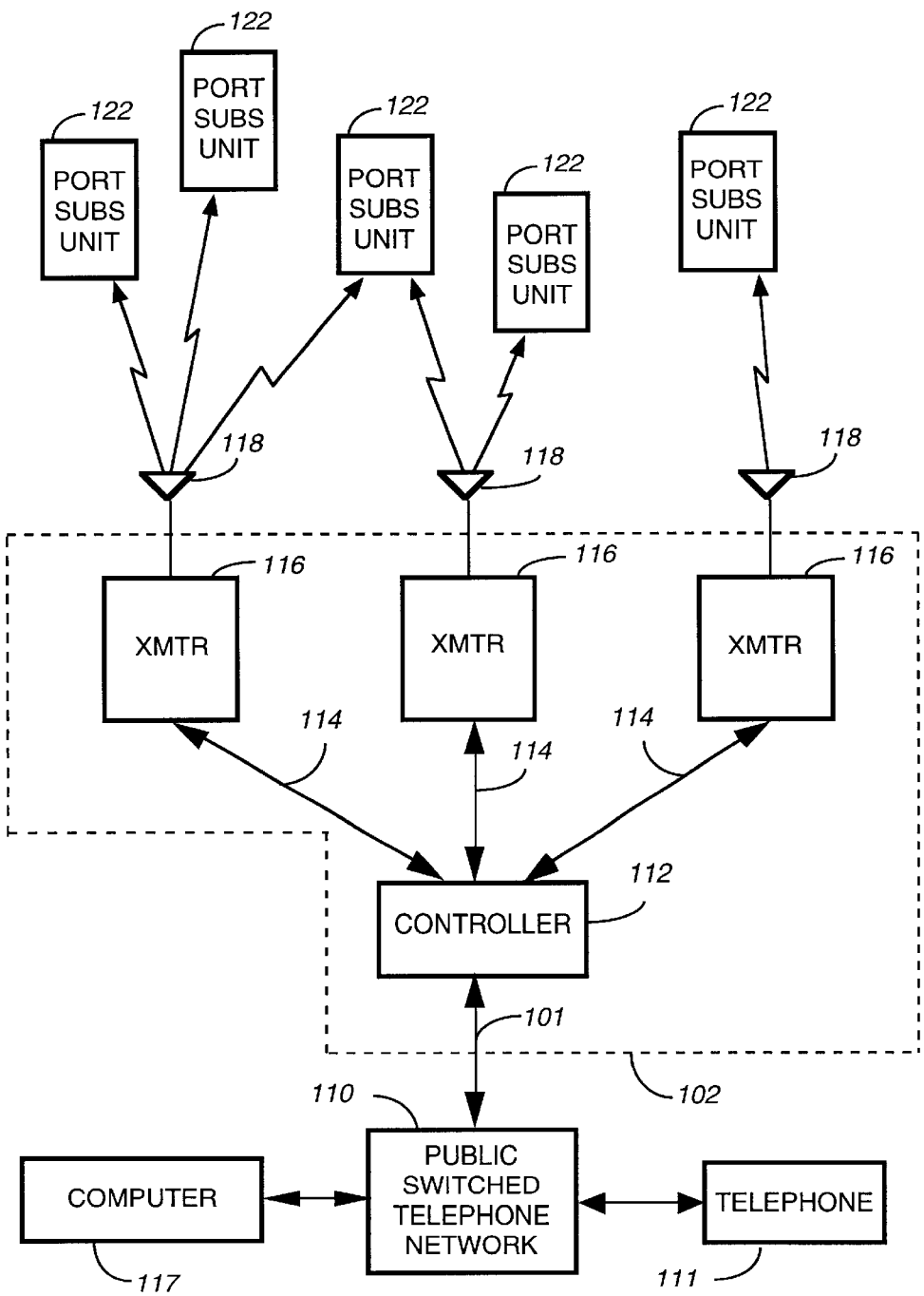
FIG. 1 is an electrical block diagram of an exemplary wireless communication system in accordance with the present invention.

FIG. 1 is an electrical block diagram of an exemplary wireless communication system in accordance with the present invention, comprising a fixed portion 102 including a controller 112 and a plurality of transmitters 116, the wireless communication system also including a plurality of portable subscriber units 122. The transmitters 116 preferably communicate with the portable subscriber units 122 utilizing conventional radio frequency (RF) techniques, and are coupled by communication links 114 to the controller 112, which controls the transmitters 116.

The hardware of the controller 112 is preferably a combination of the Wireless Messaging Gateway (WMG™) Administrator! paging terminal, and the RF-Conductor!™ message distributor manufactured by Motorola, Inc., and includes software modified in accordance with the present invention. The hardware of the transmitters 116 is preferably similar to the RF-Orchestra! transmitter and can include, in two-way wireless communication systems, the RF-Audience!™ receiver manufactured by Motorola, Inc. The portable subscriber units 122 are preferably similar to the PageWriter™ 2000 data messaging units, also manufactured by Motorola, Inc. It will be appreciated that other similar hardware can be utilized as well for the controller 112, the transmitters 116, and the portable subscriber units 122.

Each of the transmitters 116 transmits RF signals to the portable subscriber units 122 via an antenna 118. The RF signals transmitted by the transmitters 116 to the portable subscriber units 122 (outbound messages) comprise selective call addresses identifying the portable subscriber units 122, and voice and data messages originated by a caller, as well as commands originated by the controller 112 for adjusting operating parameters of the radio communication system.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 or a conventional computer 117 coupled to the PSTN 110. It will be appreciated that, alternatively, other types of communication networks, e.g., packet switched networks, the Internet, and local area networks, can be utilized as well for transporting originated messages to the controller 112.

The over-the-air transmission protocol utilized is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. It will be further appreciated that, while one embodiment for practicing the present invention is a one-way wireless communication system, the present invention is applicable also to a two-way wireless communication system.

Figure 2:
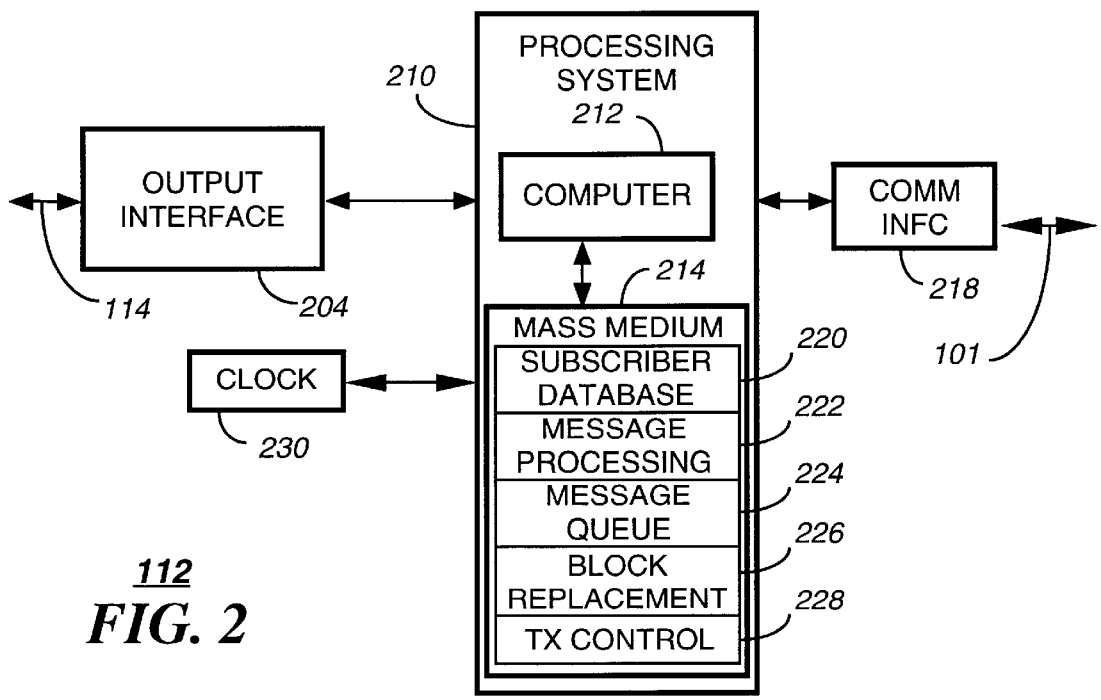
FIG. 2 is an electrical block diagram depicting an exemplary controller in accordance with the present invention.

FIG. 2 is an electrical block diagram depicting an exemplary controller 112 in accordance with the present invention. The controller 112 comprises a conventional communication interface 218 for receiving a message from a message originator via the telephone links 101. The communication interface 218 is coupled to a processing system 210 for controlling and communicating with the communication interface 218. The processing system 210 is coupled to a conventional output interface 204 for controlling and communicating with the transmitters 116 via the communication links 114. The processing system 210 is also coupled to a conventional clock 230 for providing a timing signal to the processing system 210. The processing system 210 comprises a conventional computer 212 and a conventional mass medium 214, e.g., a magnetic disk drive, programmed with information and operating software in accordance with the present invention. The mass medium 214 comprises a subscriber database 220, including information about the portable subscriber units 122 controlled by the controller 112. The mass medium 214 also includes a message processing element 222 for programming the processing system 210 to process messages for the portable subscriber units 122 through well-known techniques. The processing system 210 also includes a message queue 224 for queuing messages to be sent to the transmitters 116. In addition, the mass medium 214 includes a block replacement program for programming the processing system 210 to cooperate with at least one of the transmitters 116 to replace, at the transmitter, a block of a plurality of blocks of data that has been received but has not yet been transmitted, with the data for a near-real-time transmission, in response to a need arising to send the near-real-time transmission. The mass medium 214 further comprises a transmitter control program 228 for programming the processing system 210 to control the transmitters 116 through well-known techniques.

Figure 3:
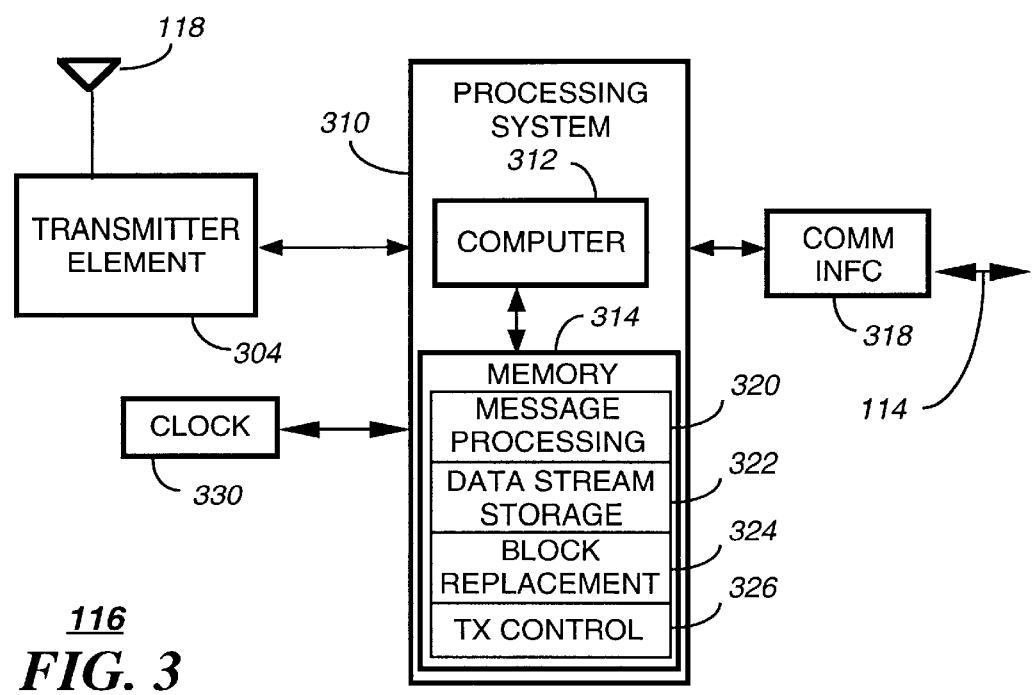
FIG. 3 is an electrical block diagram depicting an exemplary transmitter in accordance with the present invention.

FIG. 3 is an electrical block diagram depicting an exemplary transmitter 116 in accordance with the present invention. The transmitter 116 comprises a conventional transmitter element 304 coupled to the antenna 118 for transmitting a radio frequency (RF) signal. The transmitter element 304 is coupled to a processing system 310 for controlling the transmitter 116 in accordance with the present invention. A conventional clock 330 is also coupled to the processing system 310 for providing a timing signal thereto. In addition, a conventional communication interface 318 is coupled to the processing system 310 for communicating with the controller 112 through the communication link 114.

The processing system 310 comprises a conventional computer 312 coupled to a conventional memory 314, e.g., a random access memory. The memory 314 comprises message processing software 320 for processing messages from the controller 112 through well-known techniques. The memory 314 further comprises a data stream storage location 322, for storing data blocks in preparation for transmission. The memory 314 also includes a block replacement program 324 for programming the processing system 310 to replace a block of data in the data stream storage location 322, in accordance with the present invention. In addition, the memory 314 includes a transmitter control program 326 for programming the processing system 310 to control the transmitter 116 for sending messages.

Figure 4:
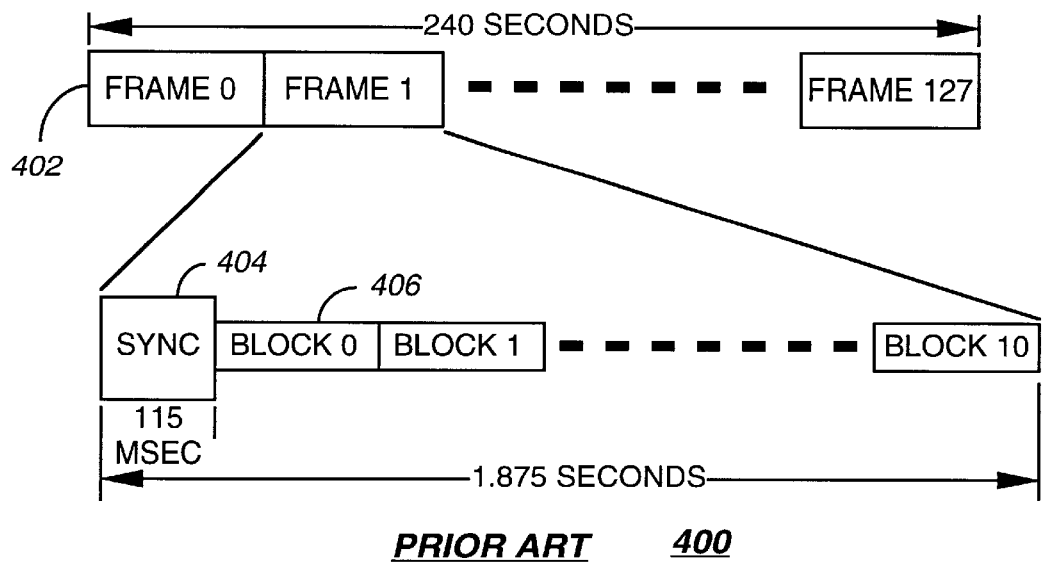
FIG. 4 is a protocol timing diagram depicting an exemplary protocol that can be utilized in accordance with the present invention.

FIG. 4 is a protocol timing diagram 400 depicting an exemplary protocol that can be utilized in accordance with the present invention. The diagram 400 is representative of the well-known FLEX™ family of protocols. One cycle 402 of the protocol consists of 128 frames of data lasting a total of 240 seconds (4 minutes). Each frame thus lasts 1.875 seconds and comprises a synchronization portion 404, followed by 11 data blocks 406 of 160 millisecond duration. Each data block 406 includes error detection and correction in the form of parity bits.

Figure 5:
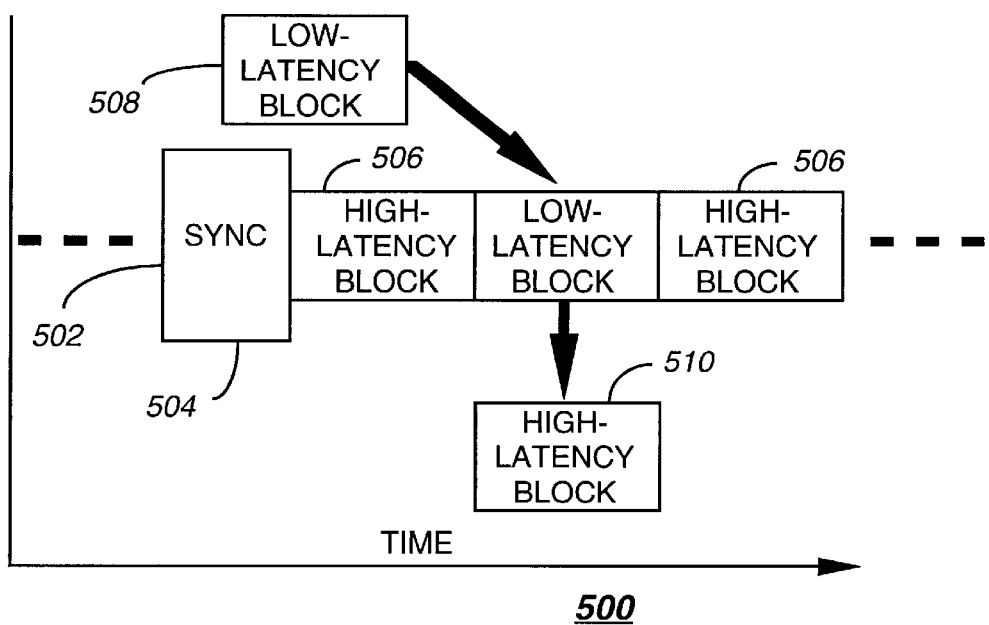
FIG. 5 is a timing diagram depicting data block replacement in accordance with the present invention.

FIG. 5 is a timing diagram 500 depicting data block replacement in accordance with the present invention. The diagram 500 comprises a portion 502 of a frame, including a synchronization portion 504 and three data blocks. As originally received and stored by the transmitter 116, all three of the data blocks contained high-latency store-and-forward data blocks. Before transmission of the center high-latency block 510, the controller 112 sends a block of low-latency data 508 for a near-real-time transmission. In response, the transmitter 116 replaces the high-latency block 510 with the block of low latency data 508, advantageously allowing the low-latency block 508 to be sent at the soonest possible time.

Figure 6:
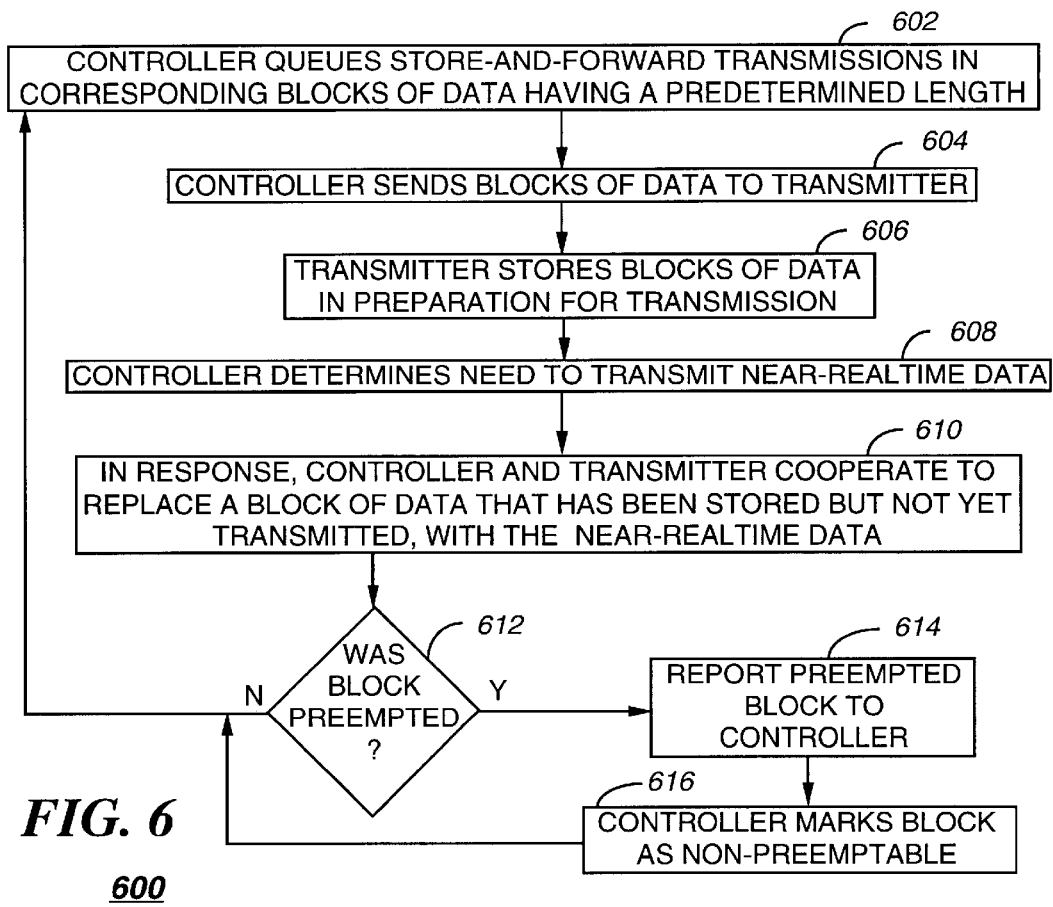
FIGS. 6, 7, and 8 are flow charts depicting operation of the wireless communication system in accordance with the present invention.
Figure 7:
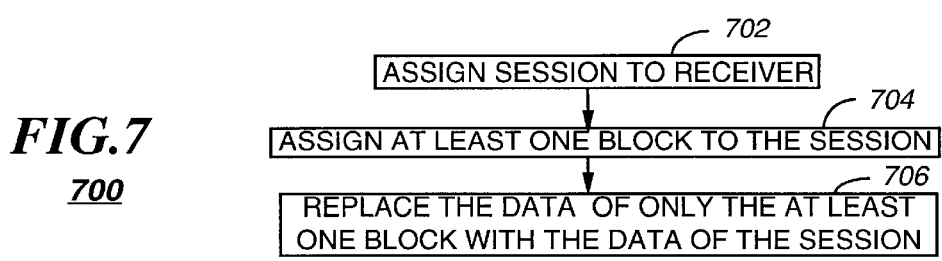
Figure 8:
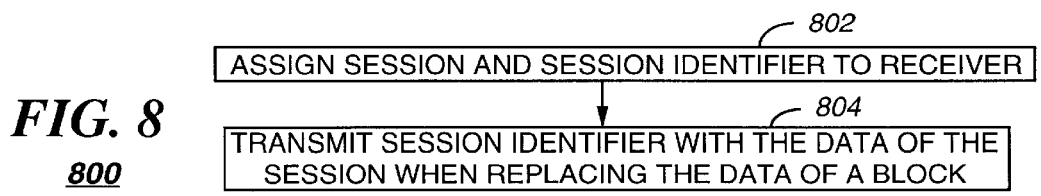

FIGS. 6, 7, and 8 are flow charts depicting operation of the wireless communication system in accordance with the present invention. Referring to FIG. 6, the controller 112 queues 602 data for store-and-forward transmissions in corresponding data blocks having a predetermined length, e.g., the data blocks 406 of 160 millisecond duration. The controller 112 then sends 604 the data blocks to the transmitters 116 that will transmit the data. The transmitters 116 store 606 the blocks of data in preparation for transmission at the designated launch times. The controller 112 then determines 608 a need to transmit near-real-time data, i.e., data that requires a low latency. In response, the controller 112 and at least one transmitter 116 that will send the near-real-time data cooperate 610 to replace one of the blocks of data that has been stored in preparation for transmission, but that has not yet been transmitted, with the near-real-time data. Preferably, the replacing of the store-and-forward data by the near-real-time data is done on a preemptive basis by locating an appropriate store-and-forward data block that has not yet been transmitted, but is scheduled to be sent soon, and taking its place in the transmission sequence. It will be appreciated that selected blocks can be protected from having to carry the near-real-time transmissions. Such selected blocks can be, for example, blocks carrying necessary control information, and blocks that have been preempted once before.

Efficient store-and-forward protocols send the addresses of the intended recipients early in the frame. Thus, it is possible when using preemptive replacement that the address of the intended recipient of the data being replaced has already been sent when the preemptive replacement occurs. Thus, to prevent the previously addressed subscriber unit 122, whose data has been replaced, from receiving the near-real-time data, the transmitter 116 performs a predetermined algorithm, e.g., a rotation, on the parity bits of the data block. The subscriber unit 122 which was expecting the preempted data will therefore decode an uncorrectable set of parity bits, and will then proceed normally in response to receiving unusable data. For example, in a one-way system the subscriber unit would await another transmission. In a two-way system the subscriber unit would notify the system that the data was corrupted. Of course, the intended recipient of the near-real-time data is informed about the application of the predetermined algorithm, so that it can reverse what was done and correctly decode the data block. It will be appreciated by one of ordinary skill in the art that certain restrictions apply to the parity algorithms and the manipulations thereof to achieve the desired results. It will be further appreciated that means other than rotation can be used to achieve the desired result.

The attentive reader may wonder how the intended recipient of the near-real-time data knows the data is its data, since the addresses have all been sent previously. In one embodiment, preemptive data replacement after the addresses have been sent is done after a session has been assigned to a receiver, assigning one or more blocks of each frame to the session. The replacement of the data for the session preferably is performed in only the one or more blocks of each frame, where the receiver will be monitoring. When no session has been assigned, preemptive replacement can be done before the addresses have been sent. In this case, the address and data block of the intended near-real-time recipient simply replace the address and data block of the intended store-and-forward recipient. (It will be appreciated that either the preempted block or the preempting block, or both, can include multiple addresses and multiple recipients.) When no session has been assigned, preemptive replacement can be done after the addresses have been sent, provided that the block has an embedded identifier for the intended receiver, and further provided that the intended receiver monitors all blocks (practical for mainly non-battery-powered receivers). An alternative to preemptive replacement is described further below.

Returning to FIG. 6, at step 612 the processing system 310 of the transmitter 116 checks whether the block was replaced preemptively. If so, the transmitter 116 reports 614 the identity of the preempted data block to the controller 112, i.e., the queuing entity of the wireless communication system, so that the controller 112 can reschedule the preempted data block. It will be appreciated that step 614 is unnecessary in a two-way paging system, because the portable subscriber unit 122 will send a NAK (or fail to send an ACK), and, in response, the controller 112 will automatically resend the preempted message. The controller 112 then marks 616 the preempted block as non-preemptable in a subsequent transmission, and the flow returns to step 602. If, on the other hand, at step 612 the processing system 310 determines that the block was not replaced preemptively, then the flow returns to step 602.

Referring to FIG. 7, a flow chart 700 is depicted for one embodiment of session assignment. First the controller 112 assigns 702 a session to a receiver, e.g., to one of the portable subscriber units 122. A session is preferably assigned when a plurality of related near-real-time transactions are expected to occur, as happens in, for example, an e-commerce communication. The controller 112 then assigns 704 at least one block to the session, e.g., block 5 and block 10 of each frame. The controller 112 and transmitter 116 then cooperate 706 to replace the data of only the assigned blocks with the data of the session. By using this technique, the intended receiver advantageously knows when to listen for its next transaction, and preemptive replacement can be utilized without having to send the address of the receiver.

Referring to FIG. 8, a flow chart 800 is depicted for a second embodiment of session assignment. First the controller 112 assigns 802 a session and a session identifier to a receiver. The controller 112 then transmits 804 the session identifier with the data of the session when replacing the data of a block. When the session is assigned, the receiver preferably is informed of a range of blocks to monitor. When the receiver finds its session identifier in one of the blocks it is monitoring, it decodes the information in the data block. This technique is advantageous for bursty data.

An alternative to preemptive replacement is to periodically reserve at least one block of each frame for near-real-time data transmission, based upon how-much near-real-time traffic is using the wireless communication system. This alternative requires less overhead, but can reduce channel utilization by leaving some blocks with no data to carry.

When the wireless communication system has a plurality of coverage areas and includes a mechanism for determining the location of a receiver for which a near-real-time transmission is intended, the system preferably replaces the data block in only one of the coverage areas, the one being where the receiver is located. This can be done, for example, in a two-way messaging system, where the location of the portable subscriber unit 122 is determined through well-known techniques.

When using preemptive replacement, if the location of the receiver can be served by a single transmitter 116, then the preemptive replacement can be done without regard to simulcast operation. If, however, two or more transmitters, transmitting in simulcast, are needed to serve the receiver's location, then it is necessary to ensure that all the transmitters will preempt the same data block. This is because different delays in the communication links 114 will cause the preemptive near-real-time data to arrive at different times, allowing the possibility of the preemptive data being placed in different data blocks, which would violate simulcast requirements. There are several ways to solve this problem. For example, the controller 112 can tell the transmitters 116 a time (or a block) after which they are permitted to send the preemptive data. This will ensure that all transmitters have received the data and will preempt the same data block.

Figure 9:
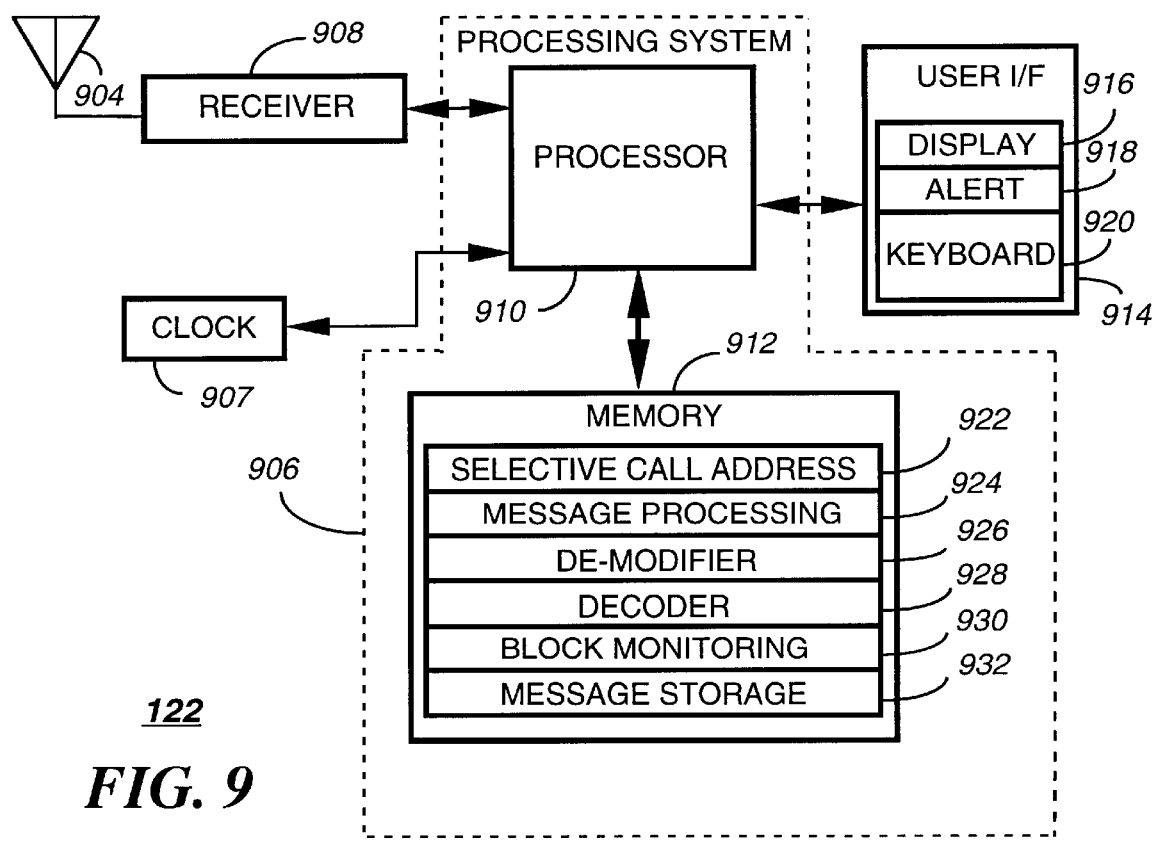
FIG. 9 is an electrical block diagram of an exemplary portable subscriber unit in accordance with the present invention.

FIG. 9 is an electrical block diagram of an exemplary portable subscriber unit 122 in accordance with the present invention. The portable subscriber unit 122 comprises an antenna 904 for intercepting an outbound message. The antenna 904 is coupled to a conventional receiver 908 for receiving the outbound message. The receiver 908 is coupled to a processing system 906 for processing the outbound message and for controlling the portable subscriber unit 122 in accordance with the present invention. A user interface 914 preferably is also coupled to the processing system 906 for interfacing with a user. The user interface 914 comprises a conventional display 916 for displaying the outbound message, a conventional alert element 918 for alerting the user when the outbound message arrives, and a conventional keyboard 920 for controlling the portable subscriber unit 122. A conventional clock 907 is also coupled to the processing system 906 for supporting time keeping requirements of the portable subscriber unit 122.

The processing system 906 comprises a conventional processor 910 and a conventional memory 912, preferably a random access memory (RAM). The memory 912 comprises software elements and other variables for programming the processing system 906 in accordance with the present invention. The memory 912 preferably includes a selective call address 922 to which the portable subscriber unit 122 is responsive. In addition, the memory 912 includes a message processing program 924 for programming the processing system 906 to process messages through well-known techniques. The memory 912 also includes a de-modifier program 926 for programming the processing system 906 to reverse a modification made to an error detection portion of a received data block such that the data block can be correctly decoded. In addition, the memory 912 includes a decoder program 928 for programming the processing system 906 to decode the data block when the error detection portion has not undergone any modification, or has been de-modified. The memory 912 further comprises a block monitoring program 930 for programming the processing system 906 to establish in cooperation with other elements of the wireless communication system, e.g., the controller 112, at least one data block of a plurality of data blocks to be monitored for a potential near-real-time transmission. For example, the controller 112 can send the portable subscriber unit 122 a command, through well-known techniques, to monitor blocks 3 and 8 of each frame of data until a session ends. In response, the processing system 906 will monitor the designated blocks throughout the session. The memory 912 also includes message storage locations 932 for storing received messages.

Thus, it should be clear from the preceding disclosure that the present invention provides a method and apparatus that provides excellent battery life and high channel utilization for high-latency communications, while simultaneously allowing some low-latency communications to function in the same system. Advantageously, the method and apparatus allows a mix of store-and-forward transmissions and near-real-time transmissions, while maintaining high channel utilization.

Many modifications and variations of the present invention are possible in light of the above teachings. Thus, it is to be understood that, within the scope of the appended claims, the invention can be practiced other than as specifically described herein above.

What is claimed is:

1. A method in a wireless communication system for inserting, into a data stream, data for a near-real-time transmission having a duration and requiring low latency, the data stream also serving a plurality of store-and-forward transmissions which do not require low latency, without disrupting the data stream for longer than said duration, the method comprising the steps of:

queuing the plurality of store-and-forward transmissions in a corresponding plurality of blocks of data having a predetermined length;

sending the plurality of blocks of data to a transmitter;

storing the plurality of blocks of data in the transmitter in preparation for transmission;

determining a need to transmit the data for the near-real-time transmission; and replacing, at the transmitter, a block of the plurality of blocks of data that has been received but has not yet been transmitted with the data for the near-real-time transmission and modifying an error detection portion of the data in a manner that prevents use of the error detection portion, in response to the determining step.

2. The method of claim 1, modifying the error detection portion occurs after an address has been transmitted identifying a subscriber unit for which the block is intended.

3. The method of claim 1, wherein the replacing step comprises the step of periodically reserving the block for use by the near-real-time transmission, based upon how much near-real-time traffic is using the wireless communication system.

4. The method of claim 1, wherein the replacing step comprises the step of preempting a transmission of the data for one of the plurality of store-and-forward transmissions after the transmission has been scheduled by the wireless communication system.

5. The method of claim 1, further comprising the step of protecting predetermined blocks of the plurality of blocks from having to carry the near-real-time transmission.

6. The method of claim 1, further comprising the steps of:

assigning a session to a receiver;

assigning at least one block of the plurality of blocks to the session; and performing the replacing step for the data of the session in only the at least one block.

7. The method of claim 1, further comprising the step of assigning a session and a session identifier to a receiver, wherein the replacing step includes the step of transmitting the session identifier with the data of the session.

8. The method of claim 1, further comprising the step of reporting to a queuing entity of the wireless communication system that the block has been preempted, in response to preempting the block.

9. The method of claim 1, wherein the wireless communication system includes a plurality of coverage areas and a mechanism for determining where a receiver for which the near-real-time transmission is intended is located, and wherein the replacing step comprises the step of replacing the block in only one of the plurality of coverage areas, the one being where the receiver is located.

10. The method of claim 1, wherein the replacing step comprises the step of replacing both the block and an address when the replacing step occurs before the address has been transmitted identifying a receiver for which the block is intended.

11. The method of claim 1, further comprising the step of marking the block as non-preemptable with respect to a subsequent transmission, in response to preempting the block.

12. A controller in a wireless communication system for inserting, into a data stream, data for a near-real-time transmission having a duration and requiring low latency, the data stream also serving a plurality of store-and-forward transmissions which do not require low latency, without disrupting the data stream for longer than said duration, the controller comprising:

a communication interface for receiving the data for the near-real-time and store-and-forward transmissions;

a processing system coupled to the communication interface for processing the data;

an output interface coupled to the processing system for sending the data stream to a transmitter, wherein the processing system is programmed to:

queue the plurality of store-and-forward transmissions in a corresponding plurality of blocks of data having a predetermined length;

send the plurality of blocks of data to the transmitter;

determine a need to transmit the data for the near-real-time transmission; and cooperate with the transmitter to replace, at the transmitter, a block of the plurality of blocks of data that has been received but has not yet been transmitted, with the data for the near-real-time transmission, in response to the need, modify an error detection portion, to prevent use of the error detection portion to verify data integrity, when the block is replaced after an address has been transmitted identifying a subscriber unit for which the block is intended.

13. The controller of claim 12, wherein the processing system is further programmed to periodically reserve the block for use by the near-real-time transmission, based upon how much near-real-time traffic is using the wireless communication system.

14. The controller of claim 12, wherein the processing system is further programmed to preempt a transmission of the data for one of the plurality of store-and-forward transmissions after the transmission has been scheduled by the wireless communication system.

15. The controller of claim 12, wherein the processing system is further programmed to protect predetermined blocks of the plurality of blocks from having to carry the near-real-time transmission.

16. The controller of claim 12, wherein the processing system is further programmed to:

assign a session to a receiver;

assign at least one block of the plurality of blocks to the session; and replace the block for the data of the session in only the at least one block.

17. The controller of claim 12, wherein the processing system is further programmed to assign a session and a session identifier to a receiver, transmit the session identifier with the data of the session.

18. The controller of claim 12, wherein the processing system is further programmed to report to a queuing entity of the wireless communication system that the block has been preempted, in response to preempting the block.

19. The controller of claim 12, wherein the wireless communication system includes a plurality of coverage areas and a mechanism for determining where a receiver for which the near-real-time transmission is intended is located, and wherein the processing system is further programmed to replace the block in only one of the plurality of coverage areas, the one being where the receiver is located.

20. The controller of claim 12, wherein the processing system is further programmed to replace both the block and an address when replacing the block before the address has been transmitted identifying a receiver for which the block is intended.

21. The controller of claim 12, further comprising the step of marking the block as non-preemptable with respect to a subsequent transmission, in response to preempting the block.

22. A transmitter in a wireless communication system for inserting, into a data stream, data for a near-real-time transmission having a duration and requiring low latency, the data stream also serving a plurality of store-and-forward transmissions which do not require low latency, without disrupting the data stream for longer than said duration, the transmitter comprising:

a communication interface for receiving the data for the near-real-time and store-and-forward transmissions;

a processing system coupled to the communication interface for processing the data;

a transmitter element coupled to the processing system for transmitting the data stream, wherein the processing system is programmed to:

receive the plurality of store-and-forward transmissions in a corresponding plurality of blocks of data having a predetermined length;

store the plurality of blocks of data in the transmitter in preparation for transmission;

receive an indication of a need to transmit the data for the near-real-time transmission, along with the data for the near-real-time transmission;

replace a block of the plurality of blocks of data that has been received but has not yet been transmitted, with the data for the near-real-time transmission, in response to the need; and modify an error detection portion of the data for the near-real-time transmission modify an error detection portion of the data for the near-real-time transmission to prevent use of the error detection portion without first un-modifying the error detection portion.

23. A subscriber unit in a wireless communication system for receiving a data block having an error detection portion that has undergone a modification preventing use of the error detection portion to verify data integrity, the subscriber unit comprising:

a receiver for receiving the near-real-time data; and a processing system coupled to the receiver for processing the near-real-time data, wherein the processing system is programmed to reverse the modification made to the error detection portion of the data block such that the data block can be correctly decoded.

24. The subscriber unit of claim 23, wherein the processing system is further programmed to decode the data block when the error correction portion has not undergone any modification.

25. The subscriber unit of claim 23, wherein the processing system is further programmed to establish in cooperation with other elements of the wireless communication system a data block of a plurality of data blocks to be monitored for a potential near-real-time transmission.

\* \* \* \* \*